Patented Jan. 7, 1964

3,117,114
PRODUCTION OF HYDROCARBON POLYMERS

William J. Roberts, Berwyn, Pa., and Martin E. Epstein, Claymont, Del., assignors to Pennsylvania Industrial Chemical Corporation, Clairton, Pa., a corporation of Pennsylvania
No Drawing. Filed May 10, 1960, Ser. No. 27,989
3 Claims. (Cl. 260—94.2)

This invention relates to the production of thermoplastic hydrocarbon resins soluble in hydrocarbon solvents, and more particularly it is concerned with the production of polymers of isoprene.

The use of anhydrous aluminum chloride as a catalyst for the resinification of hydrocarbons has been known for many years, for instance for the polymerization of isoprene, a conjugated diolefin, and cracked distillate fractions containing it, as well as for the copolymerization of diolefins, such as isoprene, with other unsaturated hydrocarbons or aromatic hydrocarbons. As far as we are aware the common practice in such instances has been to add the aluminum chloride catalyst progressively to the hydrocarbon material to be polymerized with appropriate control of the resulting exothermic reaction. The consistent experience has been, we believe, that in such practice there is formed in addition to the desired soluble polymer a substantial proportion of an insoluble or gel-like polymer that has little utility.

In making hydrocarbon resins by the action of aluminum chloride on isoprene or mixtures of it with other hydrocarbons the production of insoluble polymer thus constitutes an objectionable feature. For instance, the insoluble polymer is not commercially useful or suitably workable so that it represents an economic charge on the desired soluble polymer, and this loss is greater the greater the proportion in which the insoluble polymer is produced. Furthermore, the separation of the desired soluble polymer from the insoluble polymer usually presents difficulties involved in filtration operations, and in consequence of the formation of emulsions in steps involving aqueous treatment of the reaction products, which problems tend further to increase the cost of the desired soluble resin.

Various expedients have been proposed for avoiding or minimizing the foregoing troubles and disadvantages. For instance, it has been suggested that the yield of soluble resin can be increased by the use of mutual solvents of, for example, isoprene and aluminum chloride such, for instance, as nitrobenzene. However, other undesirable effects are encountered thereby, such as a sharp decrease in the hardness of the soluble resin. Again, it has been proposed to dissolve the aluminum chloride in a non-complexing solvent, such as an alkyl halide, and to maintain the reaction temperature well below 0° C., which is economically undesirable. Still another proposal has been to add an olefin, such as pentene, to isoprene.

All such proposals for reducing the proportion of insoluble polymer are subject to various disadvantages. For example, the addition of olefins may be undesirable because of alteration of the characteristics of the soluble resin, they may not be conveniently available, or the added cost may militate against their use. Again, cracked distillate fractions normally have contents of olefins, and it may be commercially impractical to alter the composition by the addition of olefins. Furthermore, the use of solvents such as nitrobenzene and alkylhalides tends to increase the process costs, introduces extraneous non-hydrocarbon materials, and, in the case of complex-forming solvents the hardness of the soluble resin is generally sharply reduced. And the maintenance of the reaction system below 0° C. implies added process difficulties and added costs.

It is among the objects of the invention to provide a method of making polymers of isoprene that are soluble in hydrocarbon solvents, which is simple and easily practiced, which eliminates or largely suppresses formation of insoluble or gel-like polymers, and which otherwise avoids the disadvantages alluded to above that characterize earlier proposals in this field.

Other objects will be understood from the following specification.

The invention is predicated in large part upon our discovery that the production of soluble polymers of isoprene using aluminum chloride as a catalyst is critically dependent upon the manner in which the aluminum chloride is contacted with the hydrocarbons. More in detail, we have found that, surprisingly, the objects of the invention are attained by suspending the aluminum chloride in a compound of the group consisting of toluene and xylenes and adding the isoprene progressively thereto while maintaining the aluminum chloride in suspension. In this manner, which is the reverse of usual prior art practice, we find that the polymerization proceeds with substantial reduction in, and commonly with essential freedom from, the formation of the undesired insoluble or gel-like polymer. In this way the disadvantages attendant upon the use of such non-hydrocarbon materials as alkyl halides and nitrobenzene as solvents, and upon operation at temperatures below 0° C., are also avoided. As in related practices, we control the exothermic reaction and work up the reaction product in accordance with standard procedures.

The invention is applicable, as indicated to the production of polymers of isoprene dissolved in toluene or the individual xylenes and mixtures of them. However, toluene is preferred. Benzene is inoperative.

Paraffinic and naphthenic hydrocarbons which may be present with isoprene and the other hydrocarbons used in the practice of the invention act merely as unreactive diluents, and such diluents are not necessary in practicing our invention.

In the practice of the invention the first step is the preparation of a suspension of aluminum chloride in toluene or one of the xylenes or mixtures of the xylenes. The quantity of hydrocarbon suspending medium is not particularly critical and may vary over a wide range. Of course, sufficient suspending medium must be used to give a reaction product that can be handled suitably, both during the addition of isoprene and in the recovery operations. In general, it is desirable to use not less than about ten times as much by weight liquid suspending medium as the weight of aluminum chloride to be suspended.

A practical upper limit on the amount of the suspending medium is set by considerations involved in the working up of the reaction product for the recovery of the desired soluble hydrocarbon resin. In practice it is economically and otherwise undesirable to conduct resin manufacture under circumstances wherein the soluble resin content of the catalyst-free final reaction product is less than about 10 percent by weight, and it is generally desirable that it be over about 20 percent. Consequently the practical upper limit upon the hydrocarbon suspending medium is that the total of its quantity and of the polymerized hydrocarbon be such that the final resin concentration be at least 10 percent by weight.

The quantity of aluminum chloride used also may be varied over a rather wide range, as will be understood by those familiar with the art. Of course, sufficient catalyst to give substantially complete resinification of the reactive material fed sets the practical lower limit. The upper limit will be set by economic considerations. In general, we find that aluminum chloride ranging from about 1 percent to about 5 percent by weight of the resinifiable material charged suffices. Usually if less than about 1 percent is used there will be a tendency toward incomplete reaction in reasonable reaction times. On the other hand, amounts of aluminum chloride in excess of 5 percent are normally unnecessary, increase the cost burden, and may tend to give somewhat darker soluble resin.

The second major step in the practice of the invention consists in the addition of the isoprene to the AlCl₅ suspension. Here it is essential that vigorous agitation be maintained to keep the aluminum chloride well suspended and to insure rapid dissemination of the incoming isoprene in the liquid in the reactor, whereby to promote prompt and intimate contact of the suspended aluminum chloride with the hydrocarbons.

Inasmuch as the resinification reaction is highly exothermic, means are provided for cooling the reaction mixture, and it is desirable to correlate the rate of addition of the isoprene to the cooling efficiency so as to prevent unduly high temperatures in the reacting medium. It is particularly beneficial to add the isoprene at a uniform rate such relative to the heat of reaction and the rate of cooling as to maintain a substantially uniform temperature in the reactor. It is important also that the suspension be agitated vigorously during the addition of the isoprene. Thereby the product is uniform and the soluble resin is of lighter color than would otherwise be the case.

Temperatures as low as 0° C. are unnecessary and impose undesirable cooling burdens. Temperatures above about 25° C. are particularly suitable as industrially available cooling water will normally suffice for removing the reaction heat, thus avoiding the necessity for providing special refrigeration equipment. Higher temperatures may be employed, say up to about 75° C. Still higher temperatures tend to give undesirably dark soluble resins that may be too soft for some purposes, and also to result in increased yield of low molecular weight oily polymers.

In connection with the temperatures of the resinification reaction and its control, the practice of this invention, in addition to promoting exceptionally high yield of soluble polyisoprene resin, provides an important ancillary advantage over the previous methods of preparing resins from isoprene. In the ordinary, or prior, methods previously employed the isoprene and any other hydrocarbons are charged to a reactor vessel. Thereupon the aluminum chloride, either as such or in solution, is added to effect the resinification reaction. The latter is, however, as noted previously, vigorously exothermic. In consequence the rate and manner of catalyst addition requires considerable care and skill to maintain control of the reaction. Usually there is a form of induction period during which the initial addition of catalyst has little or no immediate effect. As the quantity of added catalyst increases, however, the polymerization reaction sets in. Frequently this reaction, and the accompanying evolution of heat, may set in at an undesirably high rate. This rate may in many cases overtax the available cooling system and result in a partially or wholly uncontrolled or "runaway" reaction, in which constant reaction temperature cannot be maintained. In addition to the hazard involved such runaway reactions usually adversely affect the quality, including lightness of color and hardness, of the desired soluble resin produced. Even in those instances where the reaction rate that initially sets in does not overtax the capacity of the cooling system, it will be seen that the capacity of the cooling system must be relatively high at the start of the reaction, and thus be in excess of the requirements in the later, less rapid stages of the reaction.

By way of contrast, when the resinification is effected by the practice of this reaction, the rate of heat evolution is essentially constant and governed by the rate of addition of the isoprene. The reaction behaves as though each infinitesimal increment of isoprene feed added reacts and evolves heat virtually instantaneously and virtually completely. This general behavior greatly facilitates provision of cooling capacity and maintenance of uniform reaction temperature and product quality. For example, if a fixed quantity of isoprene is to be added per unit time to the reactor then it is necessary only to determine the total heat of reaction per unit quantity of feed and provide the necessary cooling facilities to abstract the calculated maximum amount of heat per unit time. Conversely, if a reactor is available and equipped with cooling facilities of known capacity, then it is possible to calculate the rate at which feedstock can be added to keep the rate of heat evolution within the capacity of the cooling system.

The invention may be described further with reference to the following examples, in which the proportions are given in parts by weight.

Example 1

A solution of 45 parts of concentrated isoprene and 55 parts of toluene was stirred at 40° to 45° C. while carefully and gradually adding, according to prior practice, 2.25 parts of aluminum chloride. Reaction heat was removed by the application of an external cooling bath to the reaction vessel. Following addition of all of the aluminum chloride and a further period of stirring, the reaction mixture was worked up. The catalyst was inactivated and removed by washing with dilute aqueous acid. A considerable amount of insoluble polymer that had formed was separated by filtration. The filtrate was distilled at atmospheric pressure, using steam in the later stages, to an end point such that at 250° C. still pot temperature the ratio of water to oil in the condensate was 20 to 1 by volume. Based on the isoprene charged there was obtained 63.4 percent by weight of insoluble polymer and only 15.1 percent by weight of soluble resin.

The same proportions of toluene, isoprene and aluminum chloride were then processed in accordance with this invention. The aluminum chloride was suspended with agitation in the toluene and the isoprene was then added gradually with the temperature controlled, as in the previous test, at 40° to 45° C. The reaction product was worked up in the same fashion, but with less difficulty because of the presence of only a very small quantity of insoluble polymer. Based on the isoprene charged there was obtained only 2.2 percent by weight of insoluble polymer and 99.5 percent by weight, based on the isoprene, of a light amber, soluble resin having as ASTM ring and ball softening point of 96° C. and a Gardner color of 7½ when dissolved to 50 percent concentration in toluene.

Example 2

Two reactions were carried out as described in Example 1 using toluene and an isoprene fraction analyzing 96 percent of isoprene by ultraviolet methods.

In the case wherein the aluminum chloride was added to the solution of isoprene in toluene very considerable quantities of insoluble resin were formed and the reaction mixture presented such difficulties in handling that it was not worked up to final resin.

In contrast, when the isoprene was gradually added to a stirred suspension of aluminum chloride in the toluene no insoluble polymer was obtained. The yield of light amber, transparent soluble resin was 118 percent based on the isoprene charged; it had a softening point of 117° C. and a color of 7—. The yield in excess of the isoprene charged reflects the incorporation of toluene in the polymer.

Example 3

A concentrated isoprene fraction analyzing 82 percent by ultraviolet methods was reacted at 40° to 45° C. under the two different conditions described in Example 1 and using the same proportions of isoprene, toluene and aluminum chloride.

In the case where the aluminum chloride was added to the solution of isoprene in toluene considerable quantities of insoluble polymer were formed, and the reaction mixture was so difficult to handle that it was not completely worked up. The quantity of insoluble polymer was estimated at 65 percent of the isoprene used.

When, on the other hand, the reaction was conducted in accordance with the present invention no insoluble polymer formation was observed, the final yield of soluble resin was 93.8 percent based on the isoprene fraction used, and it had a softening point of 88° C. and a Gardner color of 7.

Although the invention has been exemplified by reference to toluene as the preferred embodiment, the individual xylenes or mixtures of them may be used following the same general procedure explained and represented by the examples. Similarly, $AlBr_3$ and other well known Friedel-Crafts catalysts may be used instead of $AlCl_3$.

The soluble resins produced in the practice of the invention are useful for the purposes and in the manner for which similar resins produced heretofore are used, as, for example, in the formulation of lacquers, varnishes, and other uses to which such soluble hydrocarbon resins are known to be and have been adapted, as will be understood in the trade.

This application is a continuation-in-part of our copending application Serial No. 660,759, now abandoned, filed May 22, 1957.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:
1. That method of making an isoprene polymer resin soluble in hydrocarbon solvents comprising the steps of suspending aluminum chloride in a compound of the group consisting of toluene and the xylenes, progressively adding isoprene to said suspension while agitating it, and recovering substantially hydrocarbon soluble polyisoprene therefrom.
2. A method according to claim 1, the temperature during addition of the isoprene being regulated between 0° and 75° C.
3. A method according to claim 1, said hydrocarbon liquid being toluene.

References Cited in the file of this patent
UNITED STATES PATENTS

| | | |
|---|---|---|
| 2,085,535 | Langedijk | June 29, 1937 |
| 2,463,596 | Butler | Mar. 8, 1949 |
| 2,624,726 | Serniuk | Jan. 6, 1953 |
| 2,734,892 | Carter | Feb. 14, 1956 |

FOREIGN PATENTS

| | | |
|---|---|---|
| 614,533 | Great Britain | Dec. 16, 1948 |

OTHER REFERENCES

Thomas: "Anhydrous Aluminum Chloride in Organic Chemistry," pages 803–807, Reinhold Publishing Corporation, New York, 1941.

UNITED STATES PATENT OFFICE
CERTIFICATE OF CORRECTION

Patent No. 3,117,114            January 7, 1964

William J. Roberts et al.

It is hereby certified that error appears in the above numbered patent requiring correction and that the said Letters Patent should read as corrected below.

Column 3, line 6, for "$AlCl_5$" read -- $AlCl_3$ --.

Signed and sealed this 16th day of June 1964.

(SEAL)
Attest:

ERNEST W. SWIDER
Attesting Officer

EDWARD J. BRENNER
Commissioner of Patents